(12) United States Patent
Seeber et al.

(10) Patent No.: US 12,455,331 B2
(45) Date of Patent: Oct. 28, 2025

(54) UNIFORM FIELD GENERATING COIL COOLING CONFIGURATION AND LEAD ROUTING

(71) Applicant: GE Precision Healthcare LLC, Waukesha, WI (US)

(72) Inventors: Derek Allan Seeber, Florence, SC (US); Timothy Elden Wise, Florence, SC (US); Garrett William Astary, Silver Spring, MD (US)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 198 days.

(21) Appl. No.: 18/534,956

(22) Filed: Dec. 11, 2023

(65) Prior Publication Data

US 2025/0189609 A1 Jun. 12, 2025

(51) Int. Cl.
*G01R 33/38* (2006.01)
*G01R 33/385* (2006.01)

(52) U.S. Cl.
CPC ....... *G01R 33/3804* (2013.01); *G01R 33/385* (2013.01)

(58) Field of Classification Search
CPC .............. G01R 33/3804; G01R 33/385; G01R 33/381; G01R 33/28; G01R 33/34; A61B 5/055
See application file for complete search history.

(56) References Cited

U.S. PATENT DOCUMENTS

| 10,031,198 | B2 * | 7/2018 | Seeber | G01R 33/3856 |
| 2010/0244836 | A1 * | 9/2010 | Hollis | G01R 33/385 |
| | | | | 324/318 |
| 2017/0003361 | A1 * | 1/2017 | Seeber | G01R 33/385 |
| 2017/0038444 | A1 * | 2/2017 | Seeber | G01R 33/3858 |
| 2020/0088818 | A1 * | 3/2020 | Thiagarajan | G01R 33/4215 |

OTHER PUBLICATIONS

Davids et al., :Predicting Magnetostimulation Thresholds in the Peripheral Nervous System using Realistic Body Models, Scientific Reports, Jul. 13, 2017, 14 pgs.
Hidalgo-Tobon et al, "Reducing Peripheral Nerve Stimulation Due To Gradient Switching Using an Additional Uniform Field Coil," Magnetic Resonance in Medicine, vol. 66, 2011, 12 pgs.

* cited by examiner

*Primary Examiner* — G.M. A Hyder
(74) *Attorney, Agent, or Firm* — Fletcher Yoder, P.C.

(57) ABSTRACT

A conductive coil assembly for a magnetic resonance imaging (MRI) system includes a substrate. The conductive coil assembly also includes a first hollow conductor coil. The conductive coil assembly further includes a second hollow conductor coil. The first hollow conductor coil and the second hollow conductor coil are both disposed on the substrate relative to each other in an interleaved spiral pattern. Respective interiors of both the first hollow conductor coil and the second hollow conductor coil are configured to receive and to circulate a coolant to cool the conductive coil assembly.

17 Claims, 12 Drawing Sheets

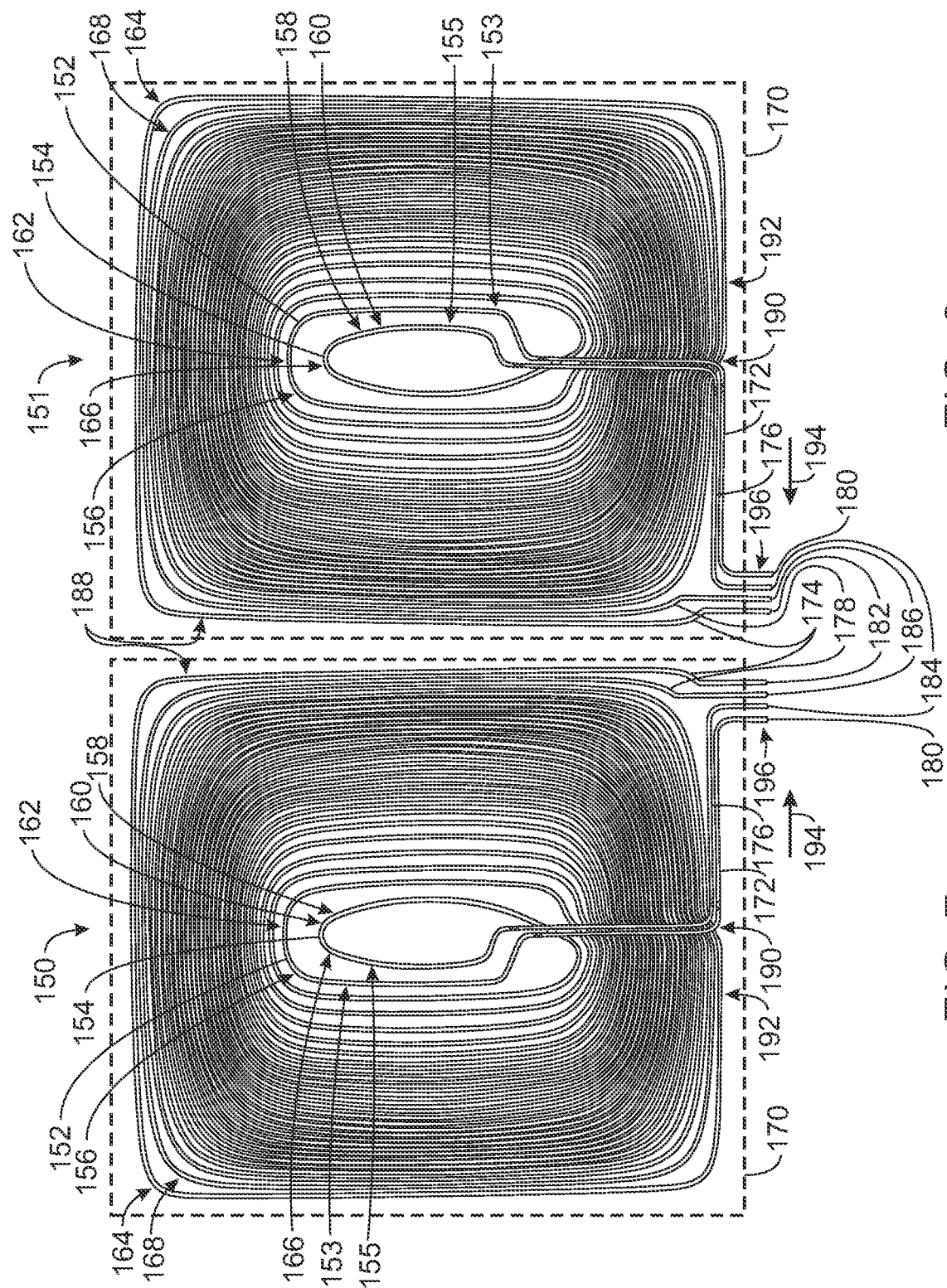

UNIFORM FIELD GENERATING COIL COOLING CONFIGURATION AND LEAD ROUTING

BACKGROUND

The subject matter disclosed herein relates to medical imaging and, more particularly, to a uniform field generating coil for a magnetic resonance imaging system.

Non-invasive imaging technologies allow images of the internal structures or features of a patient/object to be obtained without performing an invasive procedure on the patient/object. In particular, such non-invasive imaging technologies rely on various physical principles (such as the differential transmission of X-rays through a target volume, the reflection of acoustic waves within the volume, the paramagnetic properties of different tissues and materials within the volume, the breakdown of targeted radionuclides within the body, and so forth) to acquire data and to construct images or otherwise represent the observed internal features of the patient/object.

During MRI, when a substance such as human tissue is subjected to a uniform magnetic field (polarizing field $B_0$), the individual magnetic moments of the spins in the tissue attempt to align with this polarizing field, but process about it in random order at their characteristic Larmor frequency. If the substance, or tissue, is subjected to a magnetic field (excitation field $B_1$) which is in the x-y plane and which is near the Larmor frequency, the net aligned moment, or "longitudinal magnetization", $M_z$, may be rotated, or "tipped", into the x-y plane to produce a net transverse magnetic moment, $M_t$. A signal is emitted by the excited spins after the excitation signal $B_1$ is terminated and this signal may be received and processed to form an image.

When utilizing these signals to produce images, magnetic field gradients ($G_x$, $G_y$, and $G_z$) are employed. Typically, the region to be imaged is scanned by a sequence of measurement cycles in which these gradient fields vary according to the particular localization method being used. The resulting set of received nuclear magnetic resonance (NMR) signals are digitized and processed to reconstruct the image using one of many well-known reconstruction techniques.

Rapidly switching magnetic fields can lead to peripheral nerve stimulation in a patient being imaged. Thus, an upper limit is set on the magnetic field gradient strengths that be utilized in MRI to avoid peripheral nerve stimulation. It has been shown that the utilization of additional uniform concomitant field coil in conjunction with the gradient coils to avoid peripheral nerve stimulation while allowing larger rates of change in gradient with time. However, the performance of the uniform concomitant field coil is limited due to cooling issues. In particular, a path length of a uniform concomitant field coil may be too long to properly cool.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a conductive coil for a magnetic resonance imaging (MRI) system is provided. The conductive coil assembly includes a substrate. The conductive coil assembly also includes a first hollow conductor coil. The conductive coil assembly further includes a second hollow conductor coil. The first hollow conductor coil and the second hollow conductor coil are both disposed on the substrate relative to each other in an interleaved spiral pattern. Respective interiors of both the first hollow conductor coil and the second hollow conductor coil are configured to receive and to circulate a coolant to cool the conductive coil assembly.

In another embodiment, a magnetic resonance imaging (MRI) uniform field generating coil assembly is provided. The MRI uniform field generating coil assembly includes a substrate. The MRI uniform field generating coil assembly also includes a first hollow conductor coil. The MRI uniform field generating coil assembly further includes a second hollow conductor coil. The first hollow conductor coil and the second hollow conductor coil are both disposed on the substrate relative to each other in an interleaved spiral pattern. The first hollow conductor coil includes a first pair of lead ends, the second hollow conductor coil includes a second pair of lead ends, and both the first pair of lead ends and the second pair of lead ends are located in a single corner outside the interleaved spiral pattern.

In a further embodiment, a method for forming a magnetic resonance imaging (MRI) uniform field generating coil is provided. The method includes disposing a first hollow conductor coil on a substrate. The method also includes disposing a second hollow conductor coil on a substrate so that the first hollow conductor coil and the second hollow conductor coil are both disposed on the substrate relative to each other in an interleaved spiral pattern. Respective interiors of both the first hollow conductor coil and the second hollow conductor coil are configured to receive and to circulate a coolant to cool the MRI uniform field generating coil assembly.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein:

FIGS. 7 and 8 illustrate top views of uniform field generating coils in two different mirror configurations, in accordance with aspects of the present disclosure;

DETAILED DESCRIPTION

Figure 1:
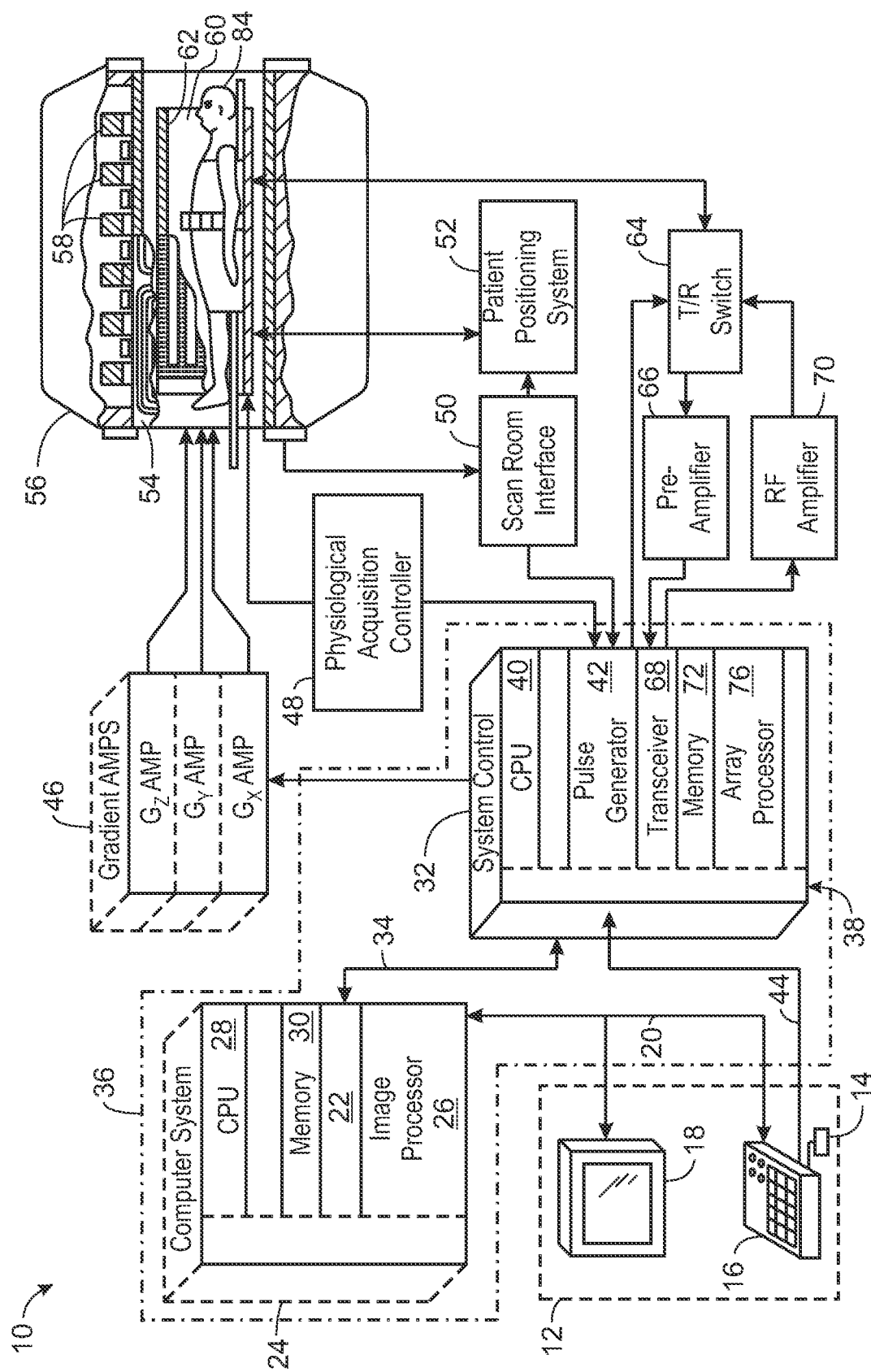
FIG. 1 illustrates a schematic diagram of a magnetic resonance imaging (MRI) system, in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

The present disclosure provides for a uniform field generating coil assembly (e.g., concomitant field assembly or peripheral nerve stimulation reduction coil assembly) for a magnetic resonance imaging system. The uniform field generating coil assembly is integrated with a gradient coil assembly of the magnetic resonance imaging system. The uniform field generating coil assembly is configured to be adequately cooled to keep the same performance as the gradient coils. Thus, when the uniform field generating coil assembly is utilized, it is configured to reduce peripheral nerve stimulation. When adequately cooled, the uniform field generating coil assembly enables a scan to run at higher slew rates and higher peak gradient strengths without encountering patient stimulation. Higher slew rates results in a faster scan time and reduced distortions. In addition, higher gradient strengths with shorter duration improves the signal-to-noise in diffusion imaging. The disclosed structure for the uniform field generating coil assembly may also be implemented on gradient field generating coil assembly.

A conductive coil (e.g., magnetic resonance imaging uniform generating coil assembly or gradient field generating coil assembly) includes a substrate. The conductive coil assembly also includes a first hollow conductor coil. The conductive coil assembly further includes a second hollow conductor coil. The first hollow conductor coil and the second hollow conductor coil are both disposed on the substrate relative to each other in an interleaved spiral pattern. Respective interiors of both the first hollow conductor coil and the second hollow conductor coil are configured to receive and to circulate a coolant to cool the conductive coil assembly.

In certain embodiments, the first hollow conductor coil includes a first coiled portion defining a first series of increasing radius loops, the second hollow conductor coil includes a second coiled portion defining a second series of increasing radius loops, the first coiled portion defines a coiled portion boundary, and the second coiled portion is located within the coiled portion boundary. In certain embodiments, the first hollow conductor coil includes a first pair of lead ends, the second hollow conductor coil includes a second pair of lead ends, and both the first pair of lead ends and the second pair of lead ends are located in a single corner outside the coiled portion boundary.

In certain embodiments, the second pair of lead ends is flanked by lead ends of the first pair of lead ends in the single corner. In certain embodiments, the first hollow conductor coil includes a first lead coupled to a first central portion of the first coiled portion, and wherein the second hollow conductor coil includes a second lead coupled to a second central portion of the second coiled portion. In certain embodiments, the first hollow conductor coil includes a third lead coupled to a first outer portion of the first coiled portion, the second hollow conductor coil includes a fourth lead coupled to a second outer portion of the second coiled portion, and the third lead and the fourth lead are disposed on a same side of the conductive coil assembly as the single corner.

In certain embodiments, a first elbow joint is coupled to the first coiled portion of the first hollow conductor coil and a second elbow joint is coupled to the second coiled portion of the second hollow conductor coil. Both the first elbow joint and the second elbow joint are coupled to respective cooling circuits or conduits to provide the coolant to the conductive coil assembly.

A MRI uniform field generating coil assembly includes a substrate. The MRI uniform field generating coil assembly also includes a first hollow conductor coil. The MRI uniform field generating coil assembly further includes a second hollow conductor coil. The first hollow conductor coil and the second hollow conductor coil are both disposed on the substrate relative to each other in an interleaved spiral pattern. The first hollow conductor coil includes a first pair of lead ends, the second hollow conductor coil includes a second pair of lead ends, and both the first pair of lead ends and the second pair of lead ends are located in a single corner outside the interleaved spiral pattern.

In certain embodiments, the second pair of lead ends is flanked by lead ends of the first pair of lead ends in the single corner. In certain embodiments, the first hollow conductor coil includes a first coiled portion defining a first series of increasing radius loops, the second hollow conductor coil includes a second coiled portion defining a second series of increasing radius loops, the first coiled portion defines a coiled portion boundary, and the second coiled portion is located within the coiled portion boundary. In certain embodiments, the first hollow conductor coil includes a first lead coupled to a first central portion of the first coiled portion, and wherein the second hollow conductor coil includes a second lead coupled to a second central portion of the second coiled portion. In certain embodiments, the first hollow conductor coil includes a third lead coupled to a first outer portion of the first coiled portion, the second hollow conductor coil includes a fourth lead coupled to a second outer portion of the second coiled portion, and the third lead and the fourth lead are disposed on a same side of the MRI uniform field generating coil assembly as the single corner.

In certain embodiments, a cooling system, wherein the cooling system comprises a first cooling circuit disposed within a first interior of the first hollow conductor coil and a second cooling circuit disposed within a second interior of the second hollow conductor coil, and both the first cooling circuit and the second cooling circuit are configured to receive and to circulate a coolant to cool the MRI uniform field generating coil assembly. In certain embodiments, the first hollow conductor coil includes a first coiled portion defining a first series of increasing radius loops, the second hollow conductor coil comprises a second coiled portion defining a second series of increasing radius loops, wherein the cooling system further includes a third cooling circuit coupled to a first elbow joint coupled to the first coiled portion of the first hollow conductor coil and a fourth cooling circuit coupled to a second elbow joint coupled to the second coiled portion of the second hollow conductor coil, and both the third cooling circuit and the fourth cooling circuit are configured to provide the coolant to the MRI uniform field generating coil assembly.

A method for forming a magnetic resonance imaging uniform field generating coil includes disposing a first hollow conductor coil on a substrate. The method also includes disposing a second hollow conductor coil on a substrate so that the first hollow conductor coil and the second hollow conductor coil are both disposed on the substrate relative to each other in an interleaved spiral pattern. Respective interiors of both the first hollow conductor coil and the second hollow conductor coil are configured to receive and to circulate a coolant to cool the MRI uniform field generating coil assembly. In certain embodiments, the first hollow conductor coil includes a first coiled portion defining a first series of increasing radius loops, the second hollow conductor coil includes a second coiled portion defining a second series of increasing radius loops, the first coiled portion defines a coiled portion boundary, and the second coiled portion is located within the coiled portion boundary. In certain embodiments, the first hollow conductor coil includes a first pair of lead ends, the second hollow conductor coil includes a second pair of lead ends, and both the first pair of lead ends and the second pair of lead ends are located in a single corner outside the coiled portion boundary. In certain embodiments, the second pair of lead ends is flanked by lead ends of the first pair of lead ends in the single corner. In certain embodiments, the first hollow conductor coil includes a first lead coupled to a first central portion of the first coiled portion, and wherein the second hollow conductor coil includes a second lead coupled to a second central portion of the second coiled portion.

Referring now to FIG. 1, the major components of an MRI system 10 incorporating an embodiment of the invention are shown. Operation of the system 10 is controlled from the operator console 12, which includes a keyboard or other input device 14, a control panel 16, and a display screen 18. The console 12 communicates through a link 20 with a separate computer system 22 that enables an operator to control the production and display of images on the display screen 18. The computer system 22 includes a number of modules, which communicate with each other through a backplane 24. These include an image processor module 26, a CPU module 28 and a memory module 30, which may include a frame buffer for storing image data arrays. The computer system 22 communicates with a separate system control or control unit 32 through a high-speed serial link 34. The input device 14 can include a mouse, joystick, keyboard, track ball, touch activated screen, light wand, voice control, or any similar or equivalent input device, and may be used for interactive geometry prescription. The computer system 22 and the MRI system control 32 collectively form an "MRI controller" 36.

The MRI system control 32 includes a set of modules connected together by a backplane 38. These include a CPU module 40 and a pulse generator module 42, which connects to the operator console 12 through a serial link 44. It is through link 44 that the system control 32 receives commands from the operator to indicate the scan sequence that is to be performed. The pulse generator module 42 operates the system components to execute the desired scan sequence and produces data which indicates the timing, strength and shape of the RF pulses produced, and the timing and length of the data acquisition window. The pulse generator module 42 connects to a set of gradient amplifiers 46, to indicate the timing and shape of the gradient pulses that are produced during the scan. The pulse generator module 42 can also receive patient data from a physiological acquisition controller 48 that receives signals from a number of different sensors connected to the patient, such as ECG signals from electrodes attached to the patient. And finally, the pulse generator module 42 connects to a scan room interface circuit 50, which receives signals from various sensors associated with the condition of the patient and the magnet system. It is also through the scan room interface circuit 50 that a patient positioning system 52 receives commands to move the patient to the desired position for the scan.

The pulse generator module 42 operates the gradient amplifiers 46 to achieve desired timing and shape of the gradient pulses that are produced during the scan. The gradient waveforms produced by the pulse generator module 42 are applied to the gradient amplifier system 46 having $G_x$, $G_y$, and $G_z$ amplifiers. Each gradient amplifier excites a corresponding physical gradient coil in a gradient coil assembly, generally designated 54, to produce the magnetic field gradients used for spatially encoding acquired signals. The gradient coil assembly 54 forms part of a magnet assembly 56, which also includes a polarizing magnet 58 (which in operation, provides a homogenous longitudinal magnetic field B0 throughout a target volume 60 that is enclosed by the magnet assembly 56) and a whole-body (transmit and receive) RF coil 62 (which, in operation, provides a transverse magnetic field $B_1$ that is generally perpendicular to $B_0$ throughout the target volume 60). As discussed in greater detail below, a uniform field generating coil assembly (e.g., concomitant field coil assembly) is integrated within the gradient coil assembly 54 that is configured to reduce peripheral nerve stimulation when utilized.

The resulting signals emitted by the excited nuclei in the patient may be sensed by the same RF coil 62 and coupled through the transmit/receive switch 64 to a preamplifier 66. The amplifier MR signals are demodulated, filtered, and digitized in the receiver section of a transceiver 68. The transmit/receive switch 64 is controlled by a signal from the pulse generator module 42 to electrically connect an RF amplifier 70 to the RF coil 62 during the transmit mode and to connect the preamplifier 66 to the RF coil 62 during the receive mode. The transmit/receive switch 64 can also enable a separate RF coil (for example, a surface coil) to be used in either transmit or receive mode.

The MR signals picked up by the RF coil 62 are digitized by the transceiver module 68 and transferred to a memory module 72 in the system control 32. A scan is complete when an array of raw k-space data has been acquired in the memory module 72. This raw k-space data/datum is rearranged into separate k-space data arrays for each image to be reconstructed, and each of these is input to an array processor 76 which operates to Fourier transform the data into an array of image data. This image data is conveyed through the serial link 34 to the computer system 22 where it is stored in memory 30. In response to commands received from the operator console 12, this image data may be archived in long-term storage or it may be further processed by the image processor 26 and conveyed to the operator console 12 and presented on the display 18.

Figure 2:
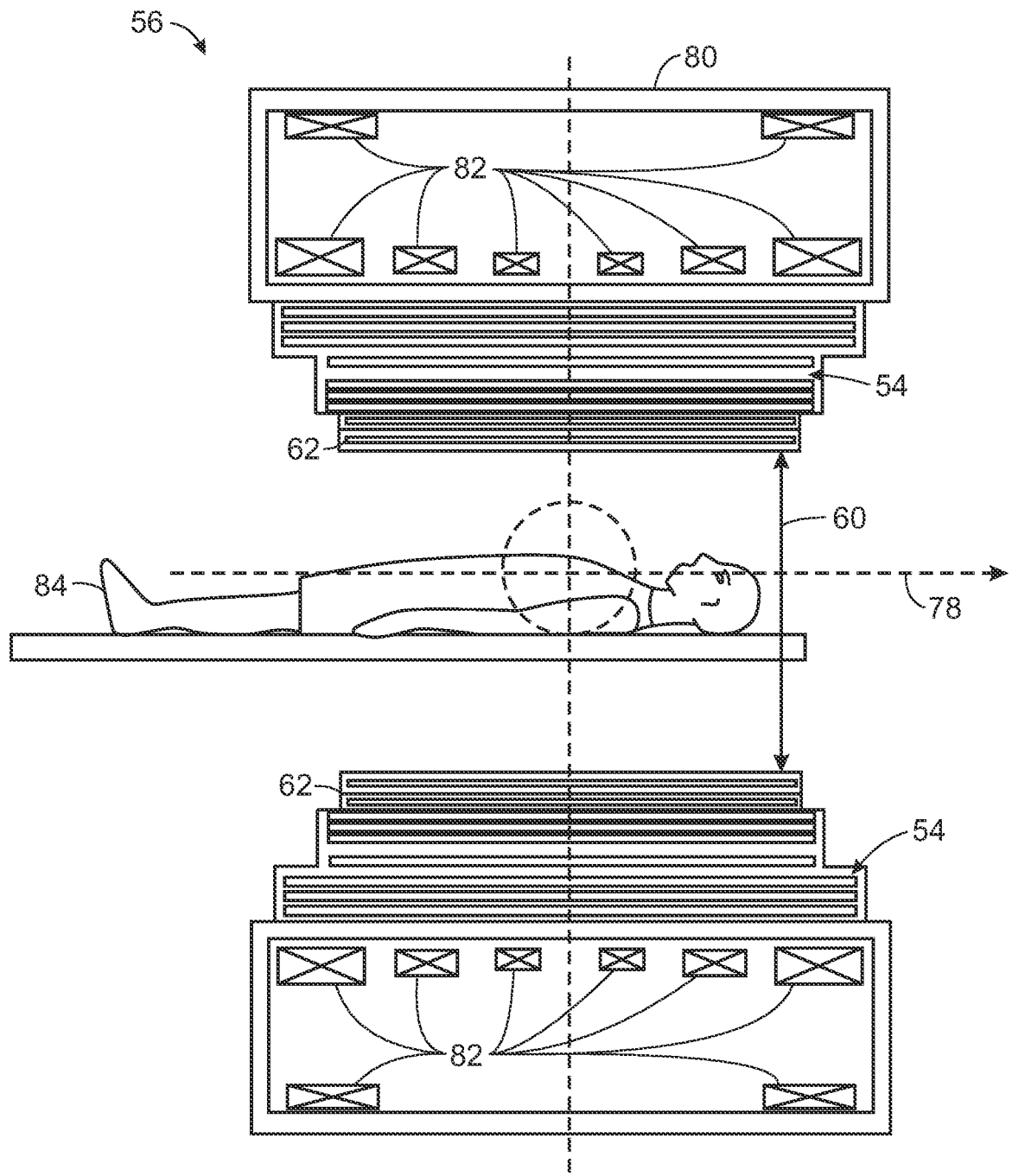
FIG. 2 illustrates a schematic cross-sectional view of a magnet assembly of the magnetic resonance imaging system in FIG. 1, in accordance with aspects of the present disclosure.

As illustrated in FIG. 2, a schematic side elevation view of the magnet assembly 56 is shown in accordance with an embodiment of the invention. The magnet assembly 56 is cylindrical in shape having a center axis 78. The magnet assembly 56 includes a cryostat 80 and one or more radially aligned longitudinally spaced apart superconductive coils 82 that form the polarizing magnet 58. The superconductive coils 82 are capable of carrying large electrical currents and are designed to create the $B_0$ field within the patient/target volume 60. As will be appreciated, the magnet assembly 56 may further include both a terminal shield and a vacuum vessel (not shown) surrounding the cryostat 80 in order to help insulate the cryostat 80 from heat generated by the rest of the MRI system 10 (FIG. 1). The magnet assembly 56 may still further include other elements such as covers, supports, suspension members, end caps, brackets, etc. (not shown). While the embodiment of the magnet assembly 56 shown in FIGS. 1 and 2 utilizes a cylindrical topology, it should be understood that topologies other than cylindrical may be used. For example, a flat geometry in a split-open MRI system may also utilize embodiments of the invention described below. As further shown in FIG. 2, a patient/imaged subject 84 is inserted into the magnet assembly 56.

Figure 3:
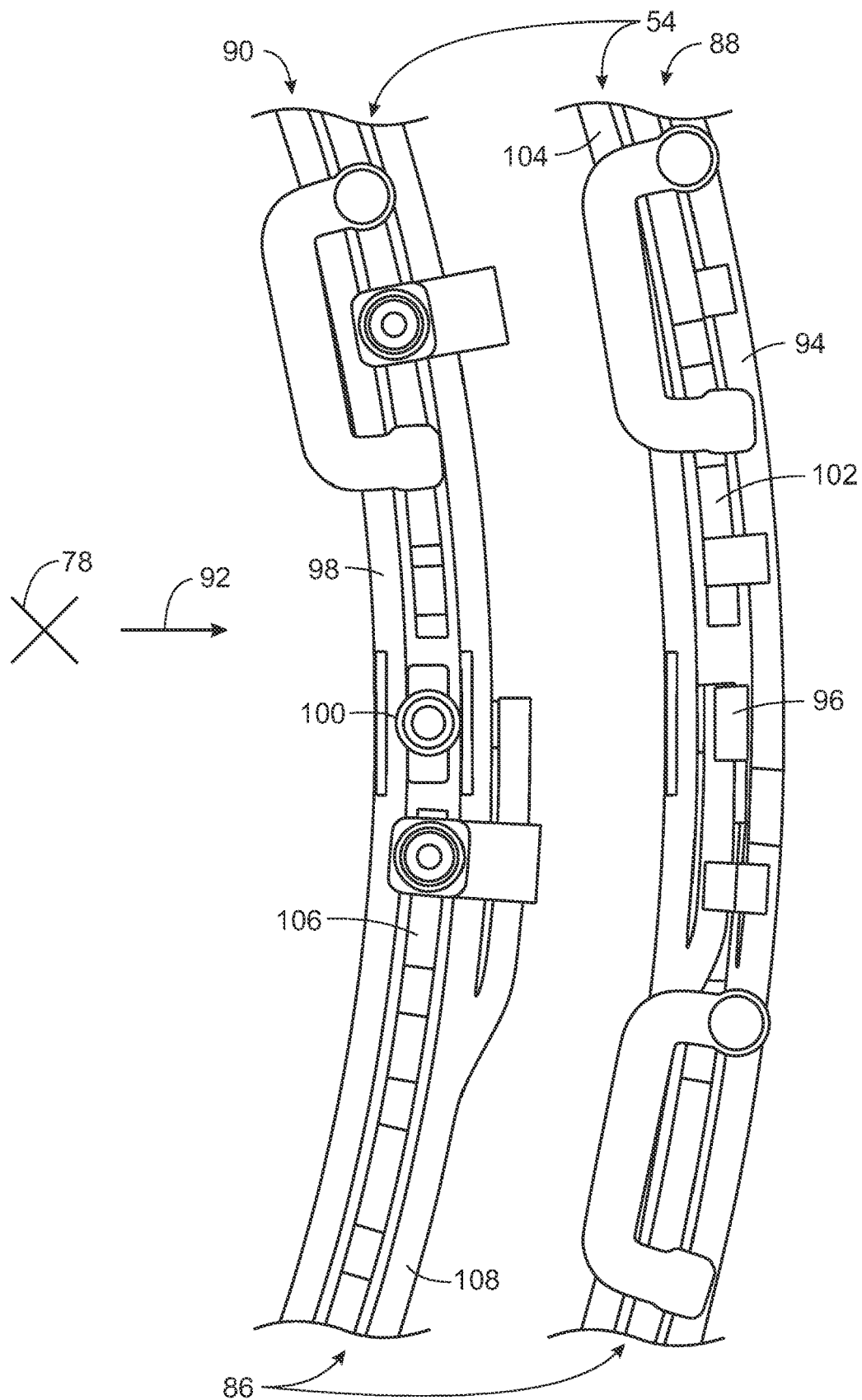
FIG. 3 illustrates a cross-sectional view of a portion of a uniform field generating coil assembly integrated within the gradient coil assembly, in accordance with aspects of the present disclosure.

FIG. 3 is a cross-sectional view of a portion of a uniform field generating coil assembly 86 integrated within the gradient coil assembly 54. As depicted, gradient coil assembly 54 includes an outer portion 88 (e.g., outer diameter portion) and an inner portion 90 (e.g., inner diameter portion). The outer portion 88 is located further from the center axis 78 of the magnet assembly (e.g., magnet assembly 56 in FIGS. 1 and 2) relative to the inner portion 90 in a radial direction 92. The gradient coil assembly 54 includes an X-axis gradient coil assembly, a Y-axis gradient coil assembly, and a Z-axis gradient coil assembly. Only portions of the gradient coil assembly 54 are shown in FIG. 3.

As depicted in FIG. 3, the outer portion 88 of the gradient coil assembly 54 includes a shield Z-axis gradient coil 94 and a lead 96 of the shield Z-axis gradient coil 94. Also, as depicted in FIG. 3, the inner portion 90 of the gradient coil assembly 54 includes a secondary X-axis gradient coil 98 and an eye lead 100 of the secondary X-axis gradient coil 98.

As depicted in FIG. 3, the uniform field generating coil assembly 86 includes in the outer portion 88 of the gradient coil assembly 54 both a shield $B_y$ uniform field generating coil 102 and a shield $B_x$ uniform field generating coil 104. The shield $B_x$ uniform field generating coil 104 is located more radially inward (e.g., relative to the center axis 78) than the shield $B_y$ uniform field generating coil 102. Both the shield $B_y$ uniform field generating coil 102 and the shield $B_x$ uniform field generating coil 104 are located more radially inward (e.g., relative to the center axis 78) than the shield Z-axis gradient coil 94 of the gradient coil assembly 54. The shield $B_y$ uniform field generating coil 102 is radially located between the shield $B_x$ uniform field generating coil 104 and the shield Z-axis gradient coil 94.

As depicted in FIG. 3, the uniform field generating coil assembly 86 includes in the inner portion 90 of the gradient coil assembly 54 both a primary $B_y$ uniform field generating coil 106 and a primary $B_x$ uniform field generating coil 108. The primary $B_y$ uniform field generating coil 106 is located more radially inward (e.g., relative to the center axis 78) than the shield $B_x$ uniform field generating coil 108. The secondary X-axis gradient coil 98 of the gradient coil assembly 54 is located more radially inward (e.g., relative to the center axis 78) than both the primary $B_y$ uniform field generating coil 106 and the primary $B_x$ uniform field generating coil 108. The primary $B_y$ uniform field generating coil 106 is radially located between the primary $B_x$ uniform field generating coil 108 and the secondary X-axis gradient coil 98. Due to lead routing, the primary $B_y$ uniform field generating coil 106 and the shield $B_y$ uniform field generating coil 102 have a higher gain than the primary $B_x$ uniform field generating coil 108 and the shield $B_x$ uniform field generating coil 104. The primary $B_y$ uniform field generating coil 106, the shield $B_y$ uniform field generating coil 102, the primary $B_x$ uniform field generating coil 108, and the shield $B_x$ uniform field generating coil 104 are configured to minimize the $B_z$ stray component.

Figure 4:
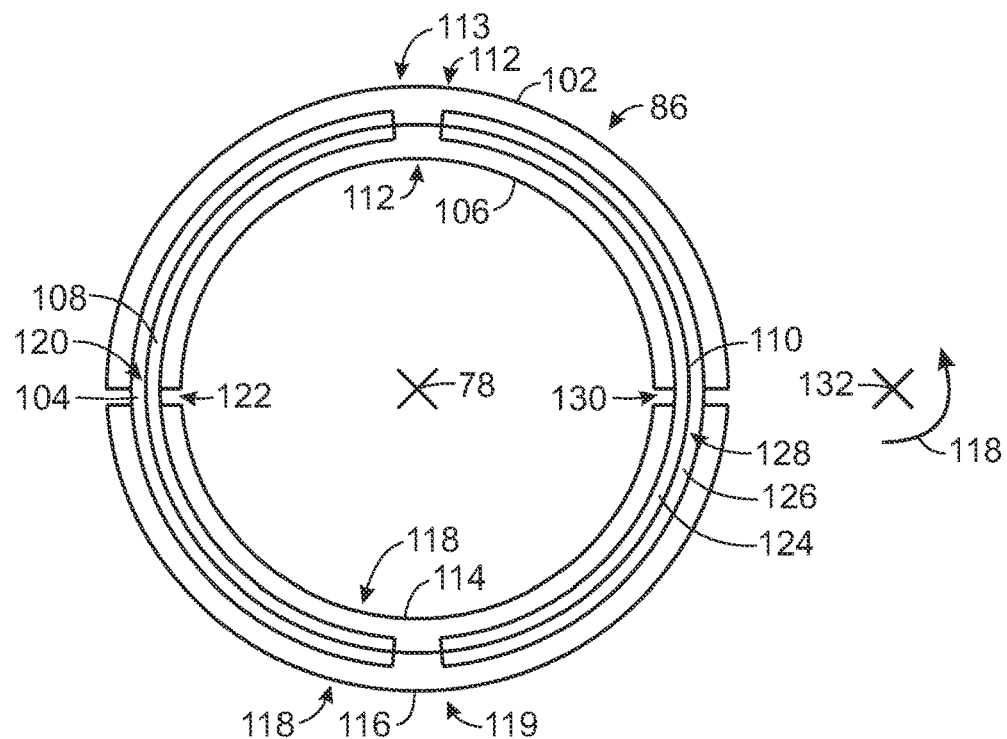
FIG. 4 illustrates a schematic cross-sectional view of uniform field generating coils of a uniform field generating coil assembly disposed on a substrate, in accordance with aspects of the present disclosure.

FIG. 4 illustrates a schematic cross-sectional view of uniform field generating coils of the uniform field generating coil assembly 86 disposed on a substrate 110. As depicted, the substrate 110 is cylindrical. The substrate 110 (e.g., former) supports the uniform field generating coils of the uniform field generating coil assembly 86 and maintains the uniform field generating coils in a desired position and shape (e.g., circular shape about a bore in which an object to be imaged is disposed) with respect to the imaging volume and/or other coils of the magnetic resonance imaging system. The substrate 110 may be made of a flexible material, for example, a polyester laminate or any other malleable or flexible non-conductive material, such as a thin fiberglass substrate. In some embodiments, all or a portion of the uniform field generating coils may be formed into a desired shape or pattern (e.g., a series of increasing radius loops) and then affixed to the substrate 110 (e.g., using epoxy). In some embodiments, the substrate 110 is a single, one-piece substrate. In various embodiments, the substrate 110 may be formed from separate pieces. Also, the substrate 110 may include cutouts or other openings to allow for a portion (e.g., an end run portion and/or a return run portion) of a uniform field generating coil to pass beneath the substrate 110 (or on the opposite side of the substrate 110). Further, it may be noted that the substrate 110 may include alignment holes or other alignment features to help align two or more coils or portions thereof that are disposed on the substrate 110.

The primary By uniform field generating coil 106 and the shield By uniform field generating coil 102 form a first pair 112 of $B_y$ uniform field generating coils disposed at a first location 113 on the substrate 110 (e.g. cylindrical substrate or former). Another primary $B_y$ uniform field generating coil 114 and shield $B_y$ uniform field generating coil 116 form a second pair 118 of $B_y$ uniform field generating coils that are located 180 degrees in a circumferential direction 118 from the first pair 112 at as second location 119 on the substrate 110.

The primary $B_x$ uniform field generating coil 108 and the shield $B_x$ uniform field generating coil 104 form a first pair 120 of $B_x$ uniform field generating coils disposed at a third location 122 on the substrate 110 (e.g. cylindrical substrate or former). Another primary $B_x$ uniform field generating coil 124 and shield $B_x$ uniform field generating coil 126 form a second pair 128 of $B_x$ uniform field generating coils that are located 180 degrees in the circumferential direction 118 from the first pair 120 at a fourth location 130 on the substrate 110. As depicted, portions of the $B_y$ uniform field generating coils overlap with portions of the $B_x$ uniform field generating coils in the circumferential direction 118 and in an axial direction 132.

Figure 5:
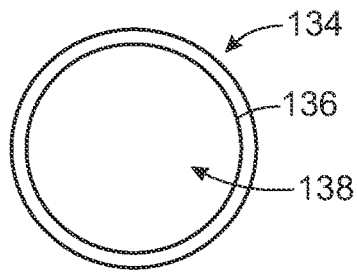
FIG. 5 illustrates a cross-section of a portion of a uniform field generating coil, in accordance with aspects of the present disclosure.

FIG. 5 illustrates a cross-section of a portion of a uniform field generating coil 134. The uniform field generating coil 134 may be any of the uniform field generating coils in of the uniform field generating coil assembly 86 in FIG. 4. The uniform field generating coil 134 is a hollow conductor coil. The uniform field generating coil 134 includes a wall 136 that defines a cavity or passage 138. The wall 136 of the uniform field generating coil 134 is made of an electrically conductive material (e.g., copper) and is supplied with an electrical current to produce a concomitant field for use in MRI. In particular, the uniform field generating coil 134 is utilized during a magnetic resonance imaging scan, when adequately cooled, is configure to reduce peripheral nerve stimulation in a subject being imaged. The uniform filed generating coil 134 may be formed of tubes, for example, cylindrical tubes, rectangular tubes, or square tubes (or tubes having cylindrical, rectangular, or square cross sections). For example, a given uniform field generating coil 134 may be formed by bending or otherwise forming at least a portion of a length of a tube. The cavity or passage 138 forms a cooling circuit and is configured to receive a coolant (e.g., de-ionized water) that is circulated within the uniform field generating coil 134 to cool the uniform field generating coil 134. As described in greater detail below, each uniform field generating coil 134 has two hollow conductors or conductor coils (e.g., two cooling circuits) in interleaved spirals. In certain embodiments, the structure described in FIG. 5 applies to gradient field generating coils.

Figure 6:
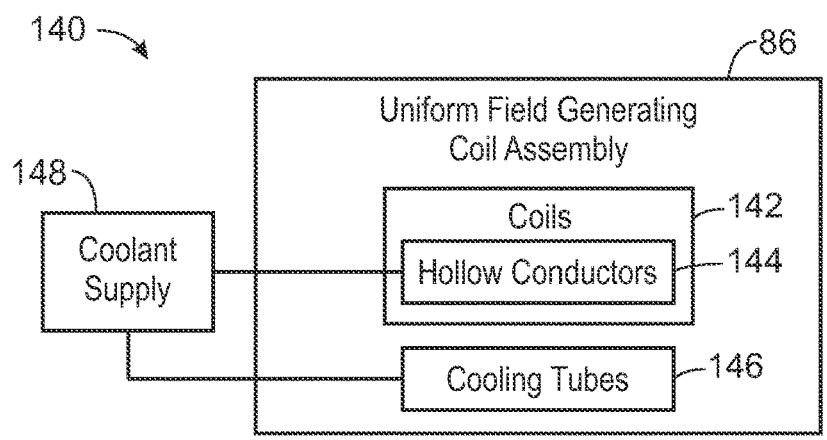
FIG. 6 illustrates a schematic diagram of a cooling system for a uniform field generating coil assembly, in accordance with aspects of the present disclosure.

FIG. 6 illustrates a schematic diagram of a cooling system 140 for the uniform field generating coil assembly 86. The uniform field generating coil assembly 86 includes a plurality of uniform generating coils 142 (e.g., the primary $B_y$ uniform field generating coils 106 and 114, the shield $B_y$ uniform field generating coils 102 and 116, the primary $B_x$ uniform field generating coils 108 and 124, and the shield $B_x$ uniform field generating coils 104 and 126 in FIG. 4). Each uniform field generating coil 142 is made of two hollow conductors or conductor coils 144 disposed relative to each other in interleaved spirals which form two respective cooling circuits. The hollow conductors 144 are configured to receive and to circulate a coolant (e.g., de-ionized water). The interleaved spirals form a shortened cooling circuit length for each uniform field generating coil 142. In certain embodiments, respective coiled portions of the two hollow conductors 144 may be coupled (e.g., via respective elbow joints) to respective cooling tubes or conduits 146 forming additional cooling circuits. The cooling tubes 146 are configured to receive and to circulate a coolant (e.g., de-ionized water). The hollow conductors and/or the cooling tubes 146 are coupled to a coolant supply 148 that provides them coolant for circulation to cool the uniform field generating coil assembly 86. In certain embodiments, the cooling system 140 described in FIG. 6 can be utilized with gradient field generating coils.

In certain embodiments, the structure described below in FIGS. 7-13 with regard to uniform field generating coils may also be utilized with other types of conductive coils such as gradient field generating coils. FIGS. 7 and 8 illustrate top views of uniform field generating coils 150, 151 in mirroring configurations. The uniform field generating coils 150, 151 are shown unrolled or flattened. In certain embodiments, as depicted in FIG. 13, the uniform field generating coil 150 may function as a primary uniform field generating coil and the uniform field generating coil may rotated 180 degrees to be located above the uniform generating coil 150 and to function as a shim uniform field generating coil. As depicted, each uniform field generating coil 150, 151 has a first hollow conductor coil 152 and a second hollow conductor coil 154 disposed relative to each other in an interleaved spiral pattern. The uniform field generating coils 150, 151 is disposed on a substrate (e.g., substrate 110 in FIG. 4), which is not shown in FIGS. 7 and 8. The interiors (e.g., cavities) of both the first hollow conductor coil 152 and the second hollow conductor coil 154 are configured to receive and to circulate a coolant (e.g., de-ionized water) to a uniform field coil generating coil assembly. The first hollow conductor coil 152 and the second hollow conductor coil 154 form respective cooling circuits 153, 155. The interleaved spiral pattern of the first hollow conductor coil 152 and the second hollow conductor coil 154 shorten the cooling circuit length to enable adequate cooling of the respective uniform field generating coils 150, 151. This cooling of the respective uniform field generating coils 150, 151 enables the coils 150, 151 to keep the same performance as the gradient coils and to reduce peripheral nerve stimulation in the subject being imaged. In particular, the uniform field generating coils 150, 151 enable a scan to run at higher slew rates and higher peak gradient strengths without encountering patient stimulation.

The first hollow conductor coil 152 includes a first coiled portion 156 defining a first series of increasing radius loops relative to an eye 158 (e.g., center) of the respective uniform field generating coils 150, 151. The second hollow conductor coil 154 includes a second coiled portion 160 defining a second series of increasing radius loops relative to the eye 158 of the respective uniform field generating coils 150, 151. The eye 158 is formed by the second hollow conductor coil 154. The first coiled portion 156 of the first hollow conductor coil 152 has a first central or inner portion 162 and a first outer portion 164 located radially outward of the first central portion 162. The second coiled portion 160 of the second hollow conductor coil 154 has a second central or inner portion 166 and a second outer portion 168 located radially outward of the second central portion 166. The first outer portion 164 of the first hollow conductor coil 152 defines a coiled portion boundary 170. The second coiled portion 160 of the second hollow conductor coil 154 is located within the coiled portion boundary 170. In certain embodiments, a first elbow joint is coupled to the first coiled portion 156 of the first hollow conductor coil 152, a second elbow joint is coupled to the second coiled portion 160 of the second hollow conductor coil 154, and both the first elbow joint and the second elbow joint are coupled to respective additional cooling circuits or conduits that provide the coolant to the MRI uniform field generating coil 150, 151.

The first hollow conductor coil 152 of each uniform field generating coil 150, 151 includes a pair of leads 172, 174.

The lead 172 is coupled to the first central portion 162 of the first coiled portion 156. The lead 174 is coupled to the first outer portion 164. The second hollow conductor coil 154 of each uniform field generating coil 150, 151 includes a pair of leads 176, 178. The lead 176 is coupled to the second central portion 166 of the second coiled portion 160. In particular, the lead 176 is coupled to the eye 158. The lead 178 is coupled to the second outer portion 168. The pair of leads 172, 174 includes respective lead ends 180, 182. The pair of leads 176, 178 includes respective lead ends 184, 186.

The leads 174, 178 are located on and extend along a same side 188 of each uniform field generating coil 150, 151. The leads 172, 176 initially extends from the respective central portions 162, 166 to a central portion 190 of a side 192 that is adjacent to the side 188. The leads 172, 176 extend above the coiled portions 156, 160 when extending to the side 192. In certain embodiments, the leads 172, 176 extend below the coiled portions 156, 160 when extending to the side 192 (see FIG. 13). The leads 172, 176 then turn 90 degrees in a direction 194 toward the side 188 and extend along the side 192 in the direction 194. The leads ends 180, 182, 184, 186 are located in a single corner 196 (where the sides 188, 192 meet) outside the coiled portion boundary 170. The lead ends 180, 182 flank the lead ends 184, 186.

Figure 9:
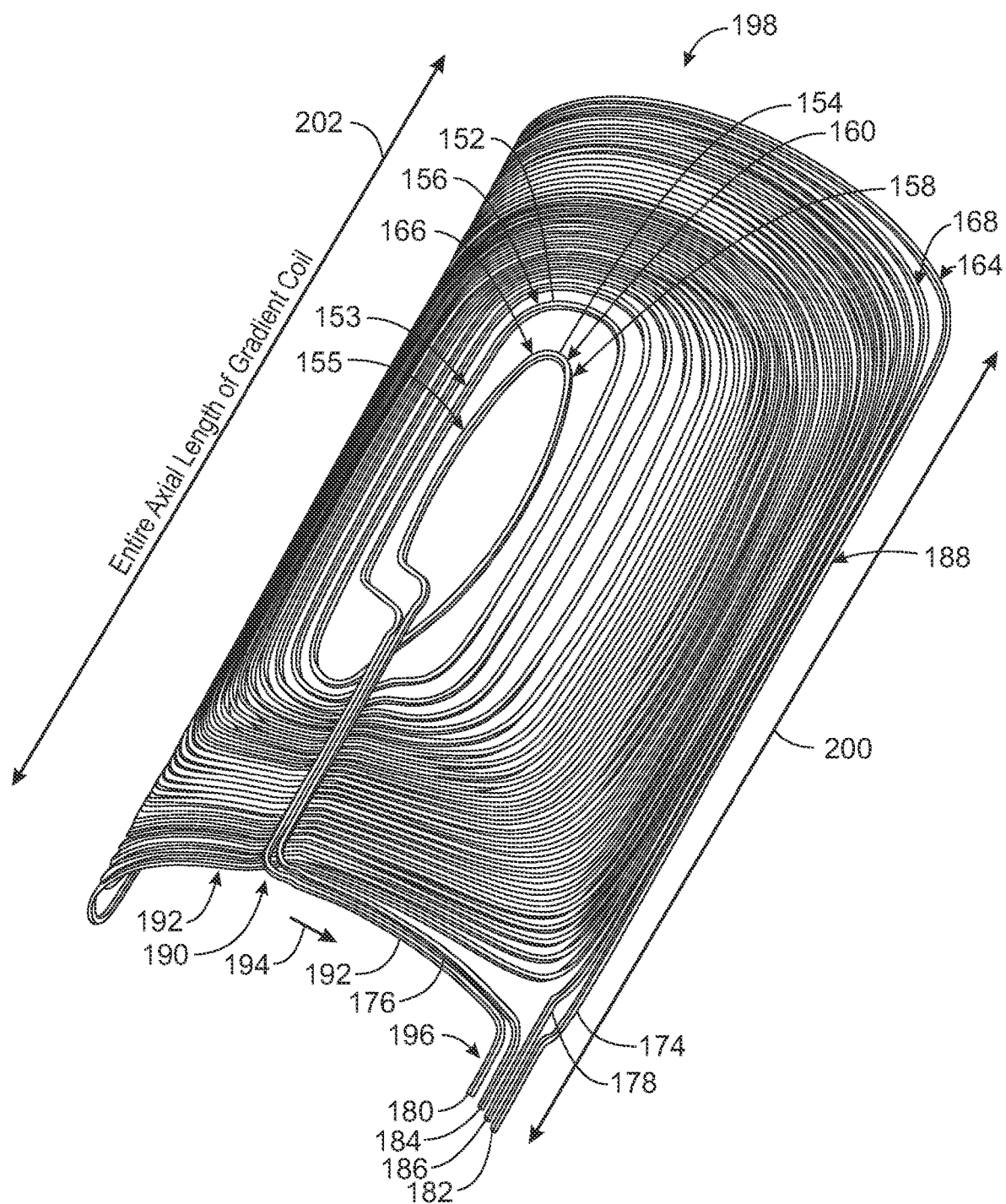
FIG. 9 illustrates a perspective view of a uniform field generating coil (e.g., a $B_x$ uniform field generating coil), in accordance with aspects of the present disclosure.

FIG. 9 illustrates a perspective view of a uniform field generating coil 198. The uniform field generating coil 198 is a $B_x$ uniform field generating coil. The uniform field generating coil 198 is shown in a rolled or bent state. The uniform field generating coil 198 is as described in FIGS. 7 and 8. As depicted, the uniform field generating coil 198 has a longitudinal length 200. The longitudinal length 200 extends an entire axial length 202 of a gradient coil. As depicted, the uniform field generating coil 198 has a first hollow conductor coil 152 and a second hollow conductor coil 154 disposed relative to each other in an interleaved spiral pattern. The uniform field generating coil 198 is disposed on a substrate (e.g., substrate 110 in FIG. 4), which is not shown in FIG. 9.

The first hollow conductor coil 152 includes a first coiled portion 156 defining a first series of increasing radius loops relative to an eye 158 (e.g., center) of the uniform field generating coil 198. The second hollow conductor coil 154 includes a second coiled portion 160 defining a second series of increasing radius loops relative to the eye 158 of the uniform field generating coil 198. The eye 158 is formed by the second hollow conductor coil 154. The first coiled portion 156 of the first hollow conductor coil 152 has a first central or inner portion 162 and a first outer portion 164 located radially outward of the first central portion 162. The second coiled portion 160 of the second hollow conductor coil 154 has a second central or inner portion 166 and a second outer portion 168 located radially outward of the second central portion 166. The first outer portion 164 of the first hollow conductor coil 152 defines a coiled portion boundary (see FIGS. 7 and 8). The second coiled portion 160 of the second hollow conductor coil 154 is located within the coiled portion boundary.

The first hollow conductor coil 152 of uniform field generating coil 198 includes a pair of leads 172, 174. The lead 172 is coupled to the first central portion 162 of the first coiled portion 156. The lead 174 is coupled to the first outer portion 164. The second hollow conductor coil 154 of uniform field generating coil 198 includes a pair of leads 176, 178. The lead 176 is coupled to the second central portion 166 of the second coiled portion 160. In particular, the lead 176 is coupled to the eye 158. The lead 178 is coupled to the second outer portion 168. The pair of leads 172, 174 includes respective lead ends 180, 182. The pair of leads 176, 178 includes respective lead ends 184, 186.

The leads 174, 178 are located on and extend along a same side 188 of the uniform field generating coil 198. The leads 172, 176 initially extends from the respective central portions 162, 166 to a central portion 190 of a side 192 that is adjacent to the side 188. The leads 172, 176 extend above the coiled portions 156, 160 when extending to the side 192. In certain embodiments, the leads 172, 176 extend below the coiled portions 156, 160 when extending to the side 192 (see FIG. 13). The leads 172, 176 then turn 90 degrees in a direction 194 toward the side 188 and extend along the side 192 in the direction 194. The leads ends 180, 182, 184, 186 are located in a single corner 196 (where the sides 188, 192 meet) outside the coiled portion boundary 170. The lead ends 180, 182 flank the lead ends 184, 186.

Figure 10:
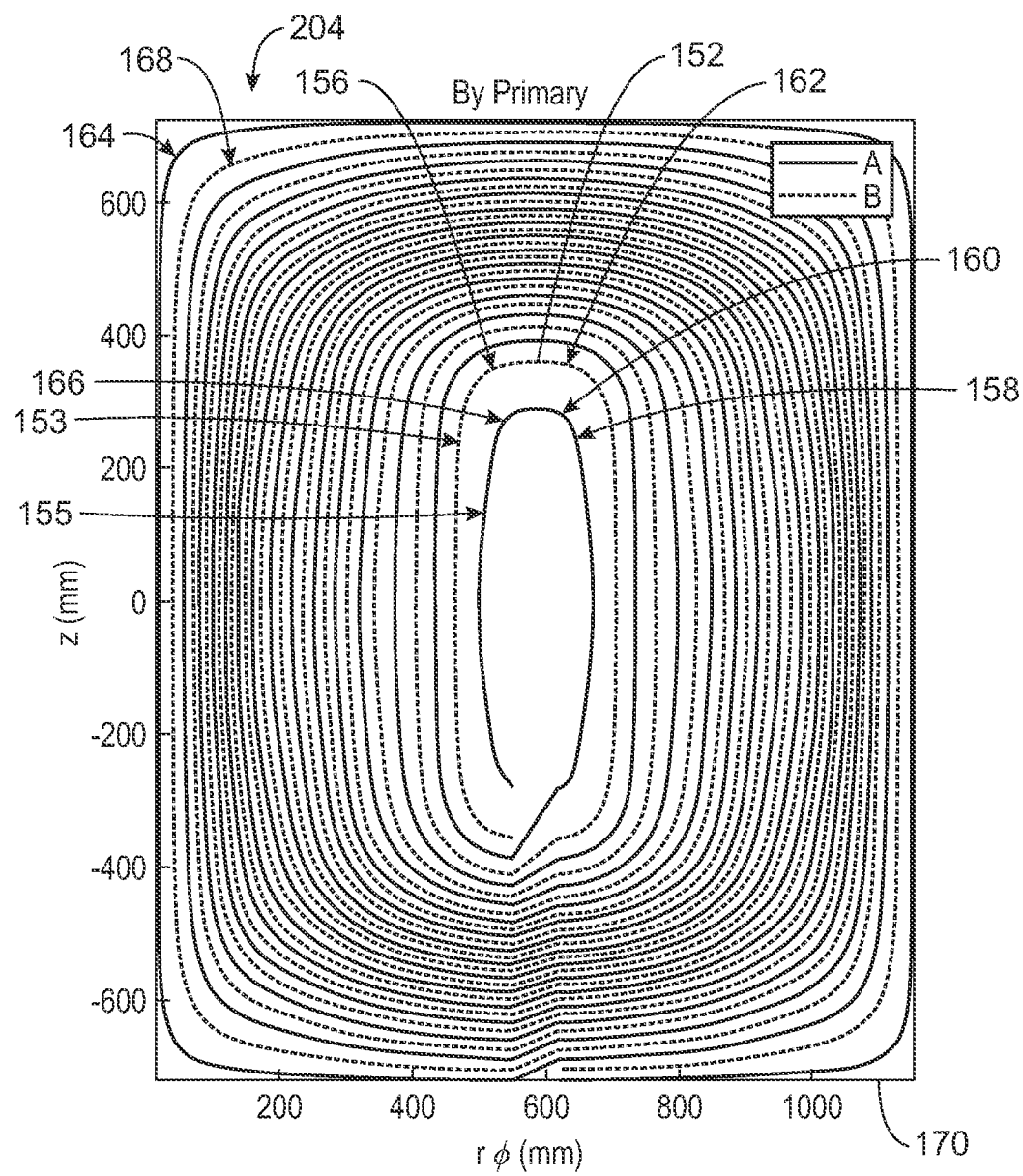
FIG. 10 illustrates a top view of coiled portions of a uniform field generating coil (e.g., a By uniform field generating coil), in accordance with aspects of the present disclosure.

FIG. 10 illustrates a top view of coiled portions of a uniform field generating coil 204. Axial (z) and radial (r) dimensions are shown of the uniform field generating coil 204. The uniform field generating coil 204 is a $B_y$ uniform field generating coil (e.g., a primary $B_y$ uniform field generating coil). The uniform field generating coil 204 is shown in an unrolled or flat state. The uniform field generating coil 204 is as described in FIGS. 7 and 8. As depicted, the uniform field generating coil 204 has a first hollow conductor coil 152 and a second hollow conductor coil 154 disposed relative to each other in an interleaved spiral pattern. The uniform field generating coil 204 is disposed on a substrate (e.g., substrate 110 in FIG. 4), which is not shown in FIG. 10.

The first hollow conductor coil 152 includes a first coiled portion 156 defining a first series of increasing radius loops relative to an eye 158 (e.g., center) of the uniform field generating coil 204. The second hollow conductor coil 154 includes a second coiled portion 160 defining a second series of increasing radius loops relative to the eye 158 of the uniform field generating coil 204. The eye 158 is formed by the second hollow conductor coil 154. The first coiled portion 156 of the first hollow conductor coil 152 has a first central or inner portion 162 and a first outer portion 164 located radially outward of the first central portion 162. The second coiled portion 160 of the second hollow conductor coil 154 has a second central or inner portion 166 and a second outer portion 168 located radially outward of the second central portion 166. The first outer portion 164 of the first hollow conductor coil 152 defines a coiled portion boundary 170. The second coiled portion 160 of the second hollow conductor coil 154 is located within the coiled portion boundary 170.

Figure 11:
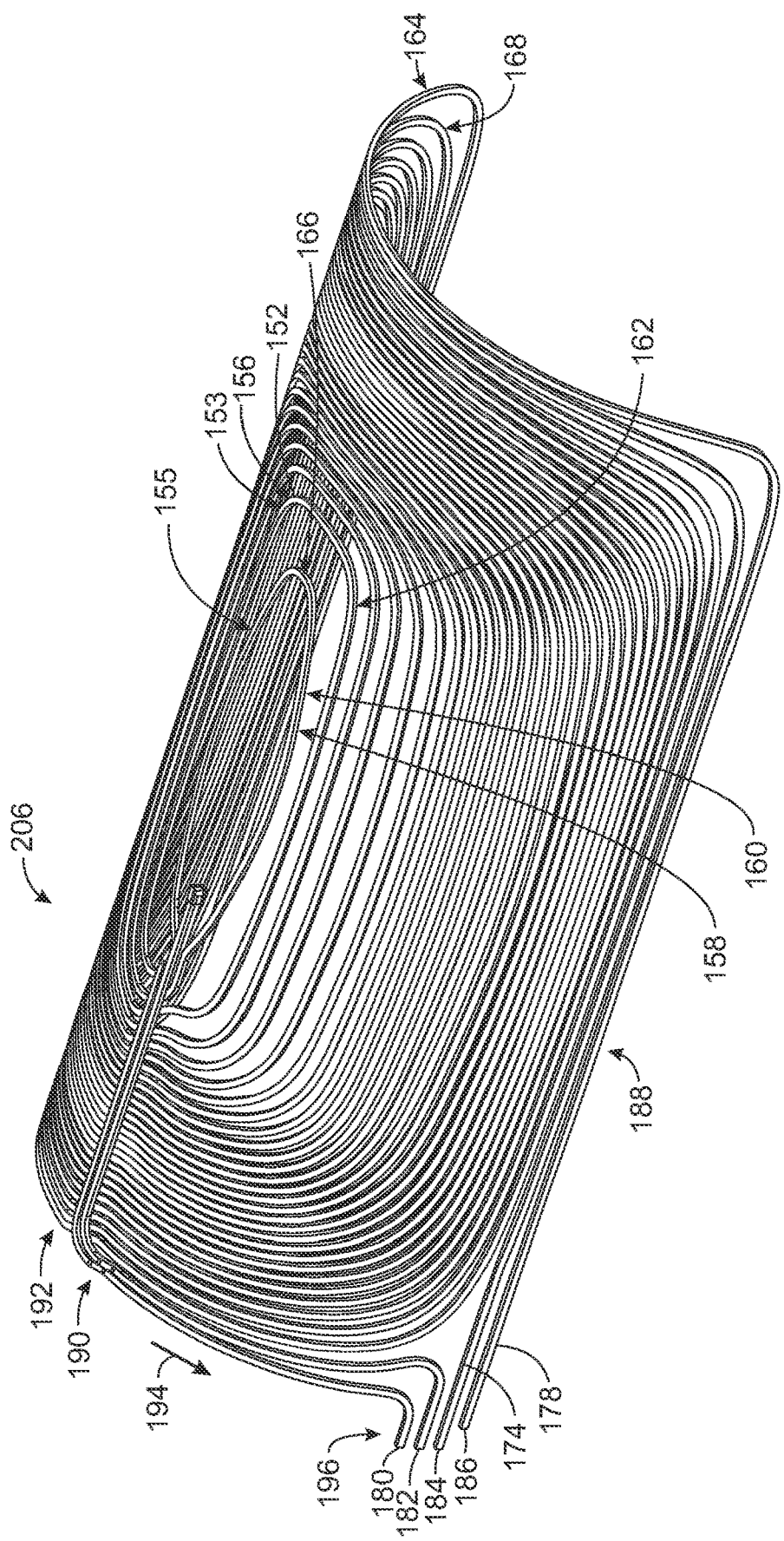
FIG. 11 illustrates a perspective view of a uniform field generating coil (e.g., primary By uniform field generating coil), in accordance with aspects of the present disclosure.

FIG. 11 illustrates a perspective view of a uniform field generating coil 206 (e.g., primary $B_y$ uniform field generating coil). The uniform field generating coil 206 is shown in a rolled or bent state. The uniform field generating coil 206 is as described in FIGS. 7 and 8. As depicted, the uniform field generating coil 206 has a first hollow conductor coil 152 and a second hollow conductor coil 154 disposed relative to each other in an interleaved spiral pattern. The uniform field generating coil 206 is disposed on a substrate (e.g., substrate 110 in FIG. 4), which is not shown in FIG. 9.

The first hollow conductor coil 152 includes a first coiled portion 156 defining a first series of increasing radius loops relative to an eye 158 (e.g., center) of the uniform field generating coil 206. The second hollow conductor coil 154 includes a second coiled portion 160 defining a second series of increasing radius loops relative to the eye 158 of the uniform field generating coil 206. The eye 158 is formed by the second hollow conductor coil 154. The first coiled portion 156 of the first hollow conductor coil 152 has a first central or inner portion 162 and a first outer portion 164 located radially outward of the first central portion 162. The second coiled portion 160 of the second hollow conductor coil 154 has a second central or inner portion 166 and a second outer portion 168 located radially outward of the second central portion 166. The first outer portion 164 of the first hollow conductor coil 152 defines a coiled portion boundary (see FIGS. 7 and 8). The second coiled portion 160 of the second hollow conductor coil 154 is located within the coiled portion boundary.

The first hollow conductor coil 152 of uniform field generating coil 206 includes a pair of leads 172, 174. The lead 172 is coupled to the first central portion 162 of the first coiled portion 156. The lead 174 is coupled to the first outer portion 164. The second hollow conductor coil 154 of uniform field generating coil 206 includes a pair of leads 176, 178. The lead 176 is coupled to the second central portion 166 of the second coiled portion 160. In particular, the lead 176 is coupled to the eye 158. The lead 178 is coupled to the second outer portion 168. The pair of leads 172, 174 includes respective lead ends 180, 182. The pair of leads 176, 178 includes respective lead ends 184, 186.

The leads 174, 178 are located on and extend along a same side 188 of the uniform field generating coil 206. The leads 172, 176 initially extends from the respective central portions 162, 166 to a central portion 190 of a side 192 that is adjacent to the side 188. The leads 172, 176 extend above the coiled portions 156, 160 when extending the side 192. The leads 172, 176 then turn 90 degrees in a direction 194 toward the side 188 and extend along the side 192 in the direction 194. The leads ends 180, 182, 184, 186 are located in a single corner 196 (where the sides 188, 192 meet) outside the coiled portion boundary 170. The lead ends 180, 182 flank the lead ends 184, 186.

Figure 12:
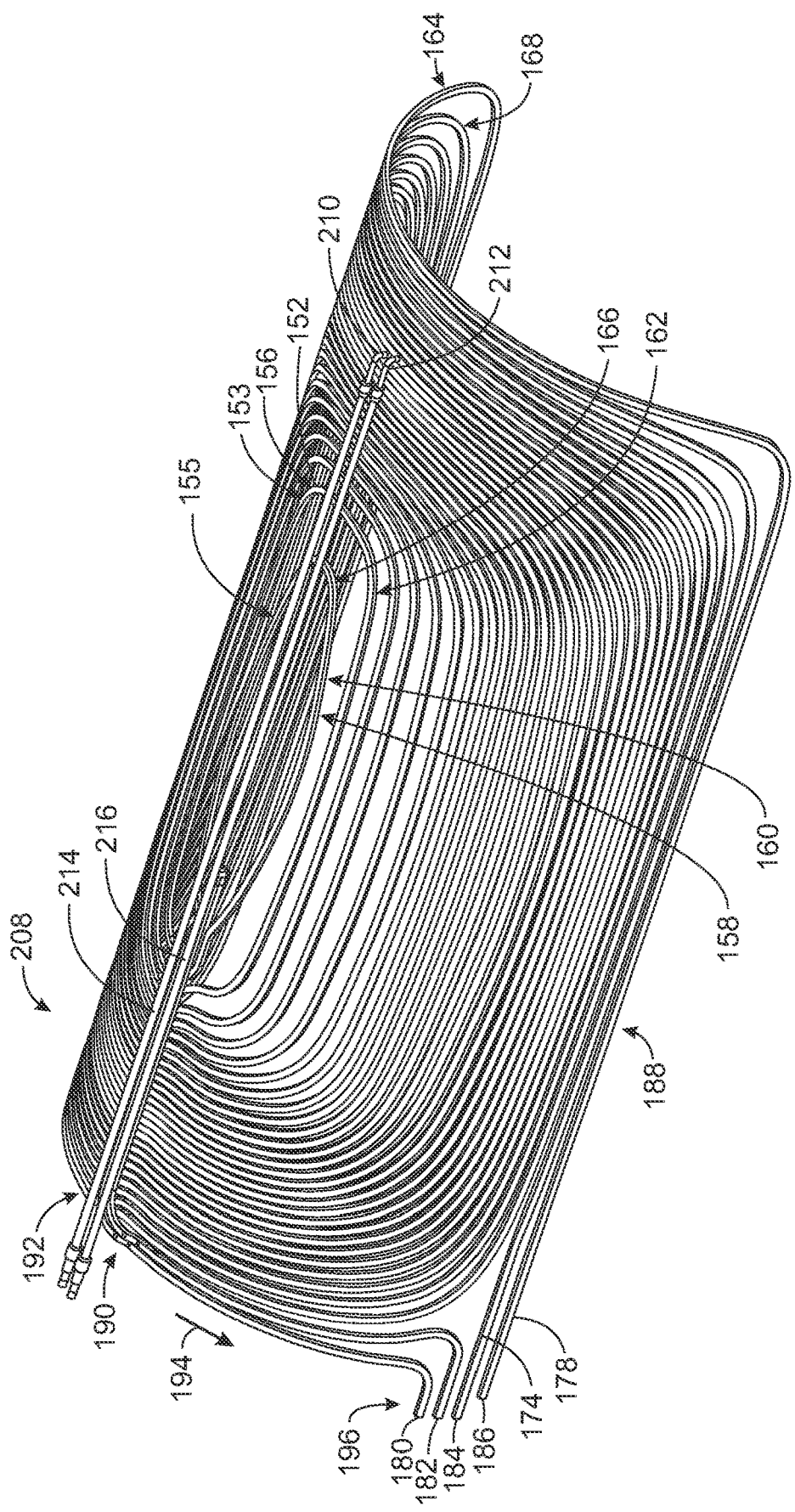
FIG. 12 illustrates a perspective view of a uniform field generating coil (e.g., primary By uniform field generating coil) (e.g., having additional cooling circuits), in accordance with aspects of the present disclosure.
Figure 13:
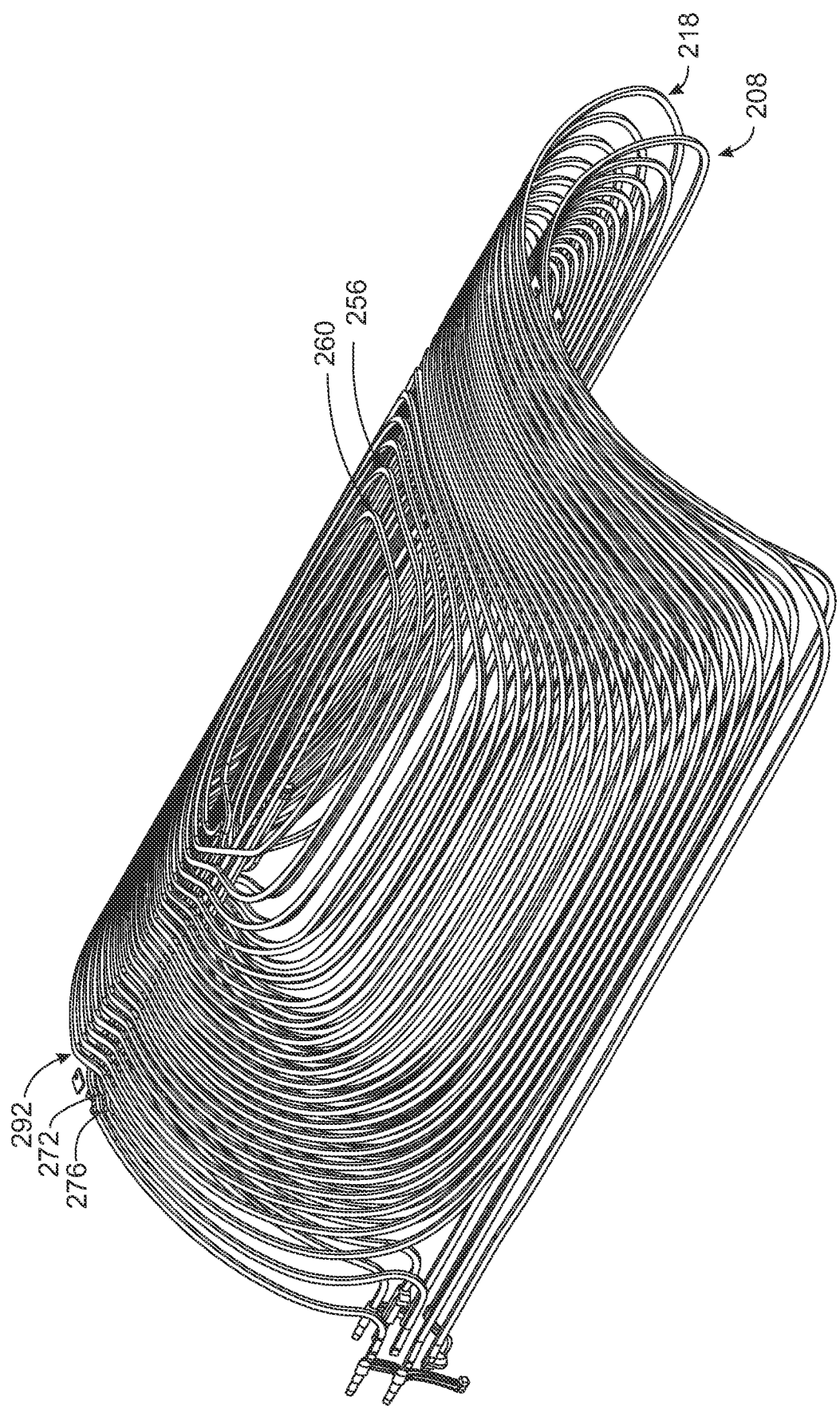
FIG. 13 illustrates a perspective view of a shield By uniform field generating coil and the primary By uniform field generating coil in FIG. 12, in accordance with aspects of present disclosure.

FIG. 12 illustrates a perspective view of a uniform field generating coil 208 (e.g., primary $B_y$ uniform field generating coil) (e.g., having additional cooling circuits). The uniform field generating coil 208 is as described in FIG. 11. In addition, a first elbow joint 210 is coupled to the first coiled portion 156 of the first hollow conductor coil 152 and a second elbow joint 212 is coupled to the second coiled portion 160 of the second hollow conductor coil 154. Both the first elbow joint 210 and the second elbow joint 212 are coupled to respective additional cooling circuits or conduits 214, 216 that provide the coolant to the MRI uniform field generating coil 150, 151. The first hollow conductor coil 152 and the second hollow conductor coil 154 provide first and second cooling circuits for receiving and circulating coolant (e.g., de-ionizing water) to cool the uniform field generating coil 208. Cooling conduits 214 and 216 form third and fourth cooling circuits for receiving and circulating coolant (e.g., de-ionizing water) to cool the uniform field generating coil 208.

FIG. 13 illustrates a perspective view of a shield $B_y$ uniform field generating coil 218 and the primary $B_y$ uniform field generating coil 208 in FIG. 12. The shield $B_y$ uniform field generating coil 218 is generally structurally the same as the primary $B_y$ uniform field generating coil 208 with a couple of exceptions. As depicted, no additional cooling circuits are coupled via elbow joints to the shield $B_y$ uniform field generating coil 218. In addition, the respective leads 272, 276 of the shield $B_y$ uniform field generating coil 218 below the coiled portions 256, 260 when extending to the side 292.

Figure 14:
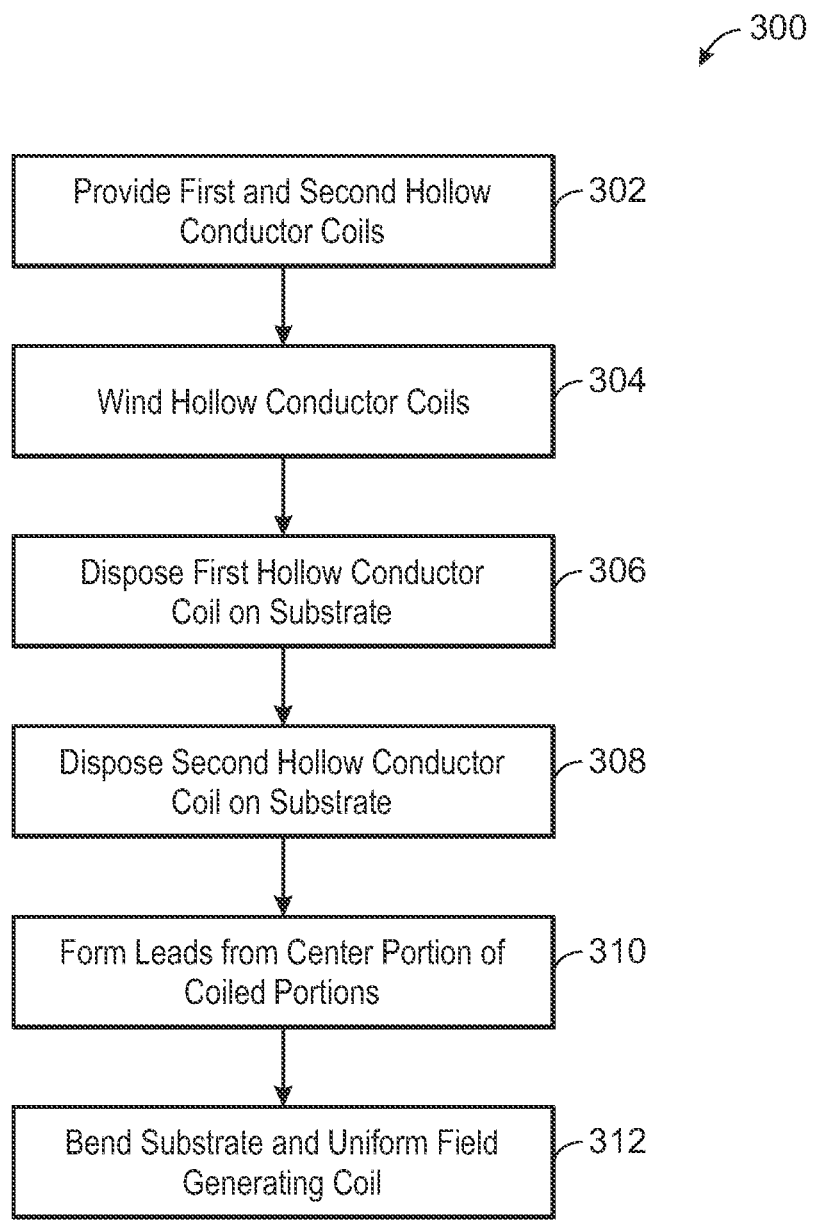
FIG. 14 illustrates a method for forming a magnetic resonance imaging (MRI) uniform field generating coil, in accordance with aspects of the present disclosure.

FIG. 14 illustrates a method 300 for forming a magnetic resonance imaging (MRI) uniform field generating coil. One or more steps of the method 300 may be performed simultaneously or in a different order from that depicted in FIG. 14. A similar method to the method 300 may be utilized to form gradient field generating coils. The method 300 includes providing a first hollow conductor coil and a second hollow conductor coil (block 302). The method 300 includes winding both the first hollow conductor coil and the second hollow conductor coil (block 304). The winding of both the first and the second hollow conductor coil may be performed to provide respective generally flat or planar wound portions to be affixed to a generally flat or planar substrate (which may be bent to a desired shape subsequently).

The method 300 includes disposing a first hollow conductor coil on a substrate (block 306). The method 300 also includes disposing a second hollow conductor coil on a substrate so that the first hollow conductor coil and the second hollow conductor coil are both disposed on the substrate relative to each other in an interleaved spiral pattern (block 308). Generally, the substrate is configured to provide support to the hollow conductor coils that are configured to provide concomitant field for use with an MRI system to reduce peripheral nerve stimulation. The first and second hollow conductor coils may be affixed to the substrate using epoxy, for example. In some embodiments, the wound portion of the first and second hollow conductor coils may be covered with a lacquer or enamel for improved adhesion with the substrate via the epoxy. For example, the first and second hollow conductor coils may be disposed at a desire positioning on the substrate with an epoxy applied, and the resulting assembly may be cured. Respective interiors of both the first hollow conductor coil and the second hollow conductor coil are configured to receive and to circulate a coolant to cool the MRI uniform field generating coil assembly.

The method 300 also includes forming respective leads from the first and second conductor coils that extend from the inner or center portion of the respective coiled portions (block 310). The leads are routed to a single corner along with leads on the other ends of the first and second conductor coils. The method 300 further includes bending (e.g., pinch-rolling) the substrate and the uniform field generating coil to a desired shape (e.g., cylindrical shape) (block 312).

Figure 15:
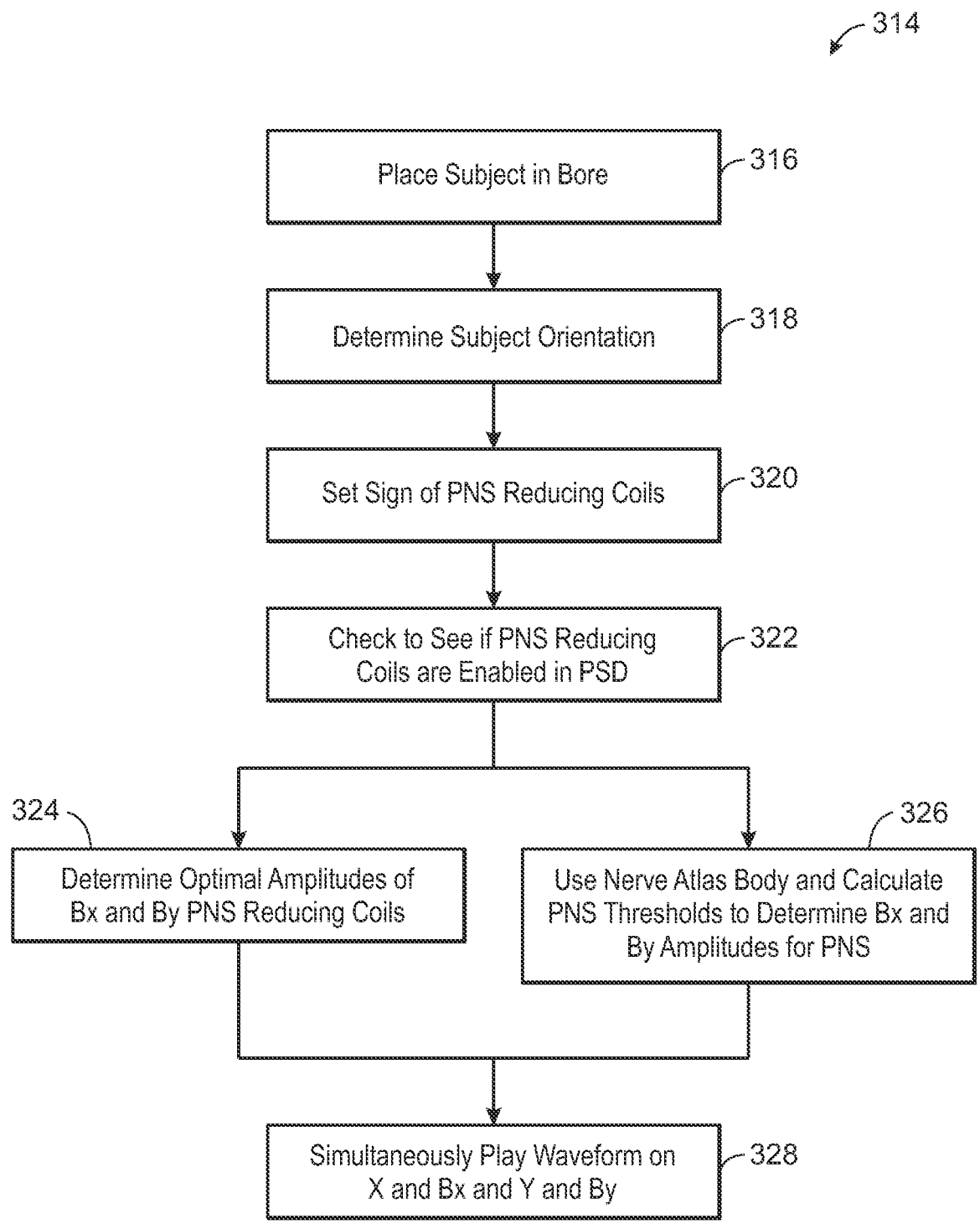
FIG. 15 illustrates a method for utilizing the uniform field generating assembly to reduce uniform patient stimulation, in accordance with aspects of the present disclosure.

FIG. 15 illustrates a method 314 for utilizing the uniform field generating assembly to reduce uniform patient stimulation. One or more steps of the method 314 may be performed simultaneously or in a different order from that depicted in FIG. 15. The method 300 includes placing a subject (e.g., patient) in a bore of a magnet of a magnetic resonance imaging system (block 316). While in the bore (or before the subject is placed in the bore), the method 314 includes determining an orientation of the subject (and part of the body of the subject to be imaged) (block 318). For example, a camera system in the scan room may be utilized to determine the orientation of the subject and part of the body of the subject to be imaged. For example, it might be determined whether the subject is head first or feet first within (or going into) the bore. The method 314 further includes setting the sign (e.g., positive or negative) for the peripheral nerve stimulation (PNS) reducing coils (e.g., uniform field generating coils) based on the orientation of the subject (block 320). The method 314 even further includes checking or determining the PNS reducing coils are enabled in the pulse sequence diagram (PSD) (block 322).

The method 314 also includes determining the optimal amplitude of $B_x$ and $B_y$ PNS reducing coils to reduce magnetic field amplitude and measured rheobase (rb) and chronaxie (c) times from previous PNS study (block 324). The IEC 60601 (for 80 centimeter cylinder length and 20 centimeter radius for the magnet) is utilized in determining the optimal amplitude. In certain embodiments, the optimal amplitude may be 1 A PNS coils per 1 A of gradient. The method 314 further includes calculating PNS thresholds on nerves (utilizing a nerve atlas body) to determine $B_x$ and $B_y$ amplitudes for PNS. It is desirable to keep the current proportional to the gradient current throughout the pulse sequence diagram to make gradwarp (e.g., system-specific correction of image geometry distortion due to gradient non-linearity) work with the PNS coils enabled.

The method 314 even further includes simultaneously playing waveform on X and $B_x$ and Y and $B_y$ (e.g., scaled by the values determined above) (block 328). Utilization of the PNS reducing coils enables a faster slew rate at higher amplitude without inducing PNS in the subject. In addition, the utilization of the PNS reducing coils enable faster echo planar imaging readout gradients at higher amplitude or a faster slew rate to maximum diffusion pulse to increase the signal-to-noise ratio. In certain embodiments, a higher bandwidth may be needed in the receiver to enable higher strength readout gradients.

Technical effects of the disclosed subject matter include providing a uniform field generating coil assembly that is configured to be adequately cooled to keep the same performance as the gradient coils. Thus, when the uniform field generating coil assembly is utilized, it is configured to reduce peripheral nerve stimulation. When adequately cooled, the uniform field generating coil assembly enables a scan to run at higher slew rates and higher peak gradient strengths without encountering patient stimulation. Higher slew rates results in a faster scan time and reduced distortions. In addition, higher gradient strengths with shorter duration improves the signal-to-noise in diffusion imaging.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A conductive coil assembly for a magnetic resonance imaging (MRI) system, comprising:
    a substrate;
    a first hollow conductor coil; and
    a second hollow conductor coil, wherein the first hollow conductor coil and the second hollow conductor coil are both disposed on the substrate relative to each other in an interleaved spiral pattern, and wherein respective interiors of both the first hollow conductor coil and the second hollow conductor coil are configured to receive and to circulate a coolant to cool the conductive coil assembly, and wherein the first hollow conductor coil comprises a first coiled portion defining a first series of increasing radius loops, the second hollow conductor coil comprises a second coiled portion defining a second series of increasing radius loops, the first coiled portion defines a coiled portion boundary, and the second coiled portion is located within the coiled portion boundary.

2. The conductive coil assembly of claim 1, wherein the first hollow conductor coil comprises a first pair of lead ends, the second hollow conductor coil comprises a second pair of lead ends, and both the first pair of lead ends and the second pair of lead ends are located in a single corner outside the coiled portion boundary.

3. The conductive coil assembly of claim 2, wherein the second pair of lead ends is flanked by lead ends of the first pair of lead ends in the single corner.

4. The conductive coil assembly of claim 2, wherein the first hollow conductor coil comprises a first lead coupled to a first central portion of the first coiled portion, and wherein the second hollow conductor coil comprises a second lead coupled to a second central portion of the second coiled portion.

5. The conductive coil assembly of claim 4, wherein the first hollow conductor coil comprises a third lead coupled to a first outer portion of the first coiled portion, the second hollow conductor coil comprises a fourth lead coupled to a second outer portion of the second coiled portion, and the third lead and the fourth lead are disposed on a same side of the conductive coil assembly as the single corner.

6. The conductive coil assembly of claim 1, further comprising a first elbow joint coupled to the first coiled portion of the first hollow conductor coil, a second elbow joint coupled to the second coiled portion of the second hollow conductor coil, and both the first elbow joint and the second elbow joint are coupled to respective cooling circuits to provide the coolant to the conductive coil assembly.

7. The conductive coil assembly of claim 1, wherein the conductive coil assembly comprises an MRI uniform field generating coil assembly, and wherein the MRI uniform field generating coil assembly is configured to reduce peripheral nerve stimulation of a subject being imaged during an MRI scan by an MRI scanner when utilized during the MRI scan.

8. The conductive coil assembly of claim 1, wherein the conductive coil assembly comprises an MRI gradient field generating coil assembly.

9. A magnetic resonance imaging (MRI) uniform field generating coil assembly, comprising:
    a substrate;
    a first hollow conductor coil; and
    a second hollow conductor coil, wherein the first hollow conductor coil and the second hollow conductor coil are both disposed on the substrate relative to each other in an interleaved spiral pattern, and wherein the first hollow conductor coil comprises a first pair of lead ends, the second hollow conductor coil comprises a second pair of lead ends, and both the first pair of lead ends and the second pair of lead ends are located in a single corner outside the interleaved spiral pattern, and wherein the first hollow conductor coil comprises a first coiled portion defining a first series of increasing radius loops, the second hollow conductor coil comprises a second coiled portion defining a second series of increasing radius loops, the first coiled portion defines a coiled portion boundary, and the second coiled portion is located within the coiled portion boundary.

10. The MRI uniform field generating coil assembly of claim 9, wherein the second pair of lead ends is flanked by lead ends of the first pair of lead ends in the single corner.

11. The MRI uniform field generating coil assembly of claim 9, wherein the first hollow conductor coil comprises a first lead coupled to a first central portion of the first coiled portion, and wherein the second hollow conductor coil comprises a second lead coupled to a second central portion of the second coiled portion.

12. The MRI uniform field generating coil assembly of claim 11, wherein the first hollow conductor coil comprises a third lead coupled to a first outer portion of the first coiled portion, the second hollow conductor coil comprises a fourth lead coupled to a second outer portion of the second coiled portion, and the third lead and the fourth lead are disposed on a same side of the MRI uniform field generating coil assembly as the single corner.

13. The MRI uniform field generating coil assembly of claim 9, comprising a cooling system, wherein the cooling system comprises a first cooling circuit disposed within a first interior of the first hollow conductor coil and a second cooling circuit disposed within a second interior of the second hollow conductor coil, and both the first cooling circuit and the second cooling circuit are configured to receive and to circulate a coolant to cool the MRI uniform field generating coil assembly.

14. The MRI uniform field generating coil assembly of claim 13, wherein the cooling system further comprises a third cooling circuit coupled to a first elbow joint coupled to the first coiled portion of the first hollow conductor coil and a fourth cooling circuit coupled to a second elbow joint coupled to the second coiled portion of the second hollow conductor coil, and both the third cooling circuit and the fourth cooling circuit are configured to provide the coolant to the MRI uniform field generating coil assembly.

15. A method for forming a magnetic resonance imaging (MRI) uniform field generating coil comprising:
disposing a first hollow conductor coil on a substrate; and
disposing a second hollow conductor coil on a substrate so that the first hollow conductor coil and the second hollow conductor coil are both disposed on the substrate relative to each other in an interleaved spiral pattern, and wherein respective interiors of both the first hollow conductor coil and the second hollow conductor coil are configured to receive and to circulate a coolant to cool the MRI uniform field generating coil assembly, and wherein the first hollow conductor coil comprises a first coiled portion defining a first series of increasing radius loops, the second hollow conductor coil comprises a second coiled portion defining a second series of increasing radius loops, the first coiled portion defines a coiled portion boundary, and the second coiled portion is located within the coiled portion boundary.

16. The method of claim 15, wherein the first hollow conductor coil comprises a first pair of lead ends, the second hollow conductor coil comprises a second pair of lead ends, and both the first pair of lead ends and the second pair of lead ends are located in a single corner outside the coiled portion boundary, wherein the second pair of lead ends is flanked by lead ends of the first pair of lead ends in the single corner.

17. The method of claim 16, wherein the first hollow conductor coil comprises a first lead coupled to a first central portion of the first coiled portion, and wherein the second hollow conductor coil comprises a second lead coupled to a second central portion of the second coiled portion.

* * * * *